United States Patent
Chandrashekar et al.

(10) Patent No.: US 12,192,750 B2
(45) Date of Patent: Jan. 7, 2025

(54) HANDOVER WITH SEQUENTIALLY IDENTIFIED PACKETS

(71) Applicant: Nokia Solutions and Networks Oy, Espoo (FI)

(72) Inventors: Subramanya Chandrashekar, Bangalore (IN); Jean-Michel Pugeat, Massy (FR); Raghuram Reddy Krishnamurthy, Bangalore (IN); Bruno Landais, Lannion (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/258,069

(22) PCT Filed: Oct. 22, 2021

(86) PCT No.: PCT/EP2021/079356
§ 371 (c)(1),
(2) Date: Jun. 16, 2023

(87) PCT Pub. No.: WO2022/128213
PCT Pub. Date: Jun. 23, 2022

(65) Prior Publication Data
US 2024/0049079 A1 Feb. 8, 2024

(30) Foreign Application Priority Data
Dec. 17, 2020 (FI) ..................... 20206322

(51) Int. Cl.
*H04W 36/08* (2009.01)
*H04W 36/02* (2009.01)
*H04W 36/18* (2009.01)

(52) U.S. Cl.
CPC ....... *H04W 36/08* (2013.01); *H04W 36/0235* (2023.05); *H04W 36/18* (2013.01)

(58) Field of Classification Search
CPC ............................................ H04W 36/00–385
See application file for complete search history.

(56) References Cited

U.S. PATENT DOCUMENTS

2009/0046659 A1* 2/2009 Sebire .................. H04W 36/02
370/329
2009/0193310 A1* 7/2009 Hashimoto ............. H04L 1/187
714/748

(Continued)

FOREIGN PATENT DOCUMENTS

CA 3033011 A1 3/2018
CN 116783934 A * 9/2023 ........ H04W 36/0069

(Continued)

OTHER PUBLICATIONS

"3rd Generation Partnership Project; Technical Specification Group Core Network and Terminals; General Packet Radio System (GPRS) Tunnelling Protocol User Plane (GTPv1-U) (Release 16)", 3GPP TS 29.281, V16.0.0, Dec. 2019, pp. 1-33.

(Continued)

*Primary Examiner* — Mehmood B. Khan
(74) *Attorney, Agent, or Firm* — SQUIRE PATTON BOGGS (US) LLP

(57) ABSTRACT

Various example embodiments relate to relate to network nodes (20A; 20B), methods and computer program products configured to hand over a communication link between a cell and user equipment (10) in a wireless communication network from a source cell (40A) to a target cell (40B; 40C). According to various, but not necessarily all, embodiments of the invention there is provided a node (20A), comprising: means configured to establish a communication link between a source cell (40A) and user equipment (10); means configured to transmit a series of data packets to the user equipment (10), each data packet comprising an associated (Continued)

sequence identifier; means to receive an acknowledgement of successful receipt of a data packet of the series by user equipment (10), the acknowledgement comprising an indication of the successfully received data packet sequence identifier; means configured to receive an indication of an identified handover target cell (40B; 40C); means configured to request handover of the user equipment (10) to the identified handover target cell (40B; 40C); means configured to receive an acknowledgement of handover request from the identified handover target cell (40B; 40C); and means to forward data packets to be transmitted to user equipment (10) to the identified target cell (40B; 40C), the forwarded data packets comprising the indication of associated sequence identifier and the most recent successfully received data packet sequence identifier. Also provided is a node (20B), comprising: means configured to receive a request for handover of user equipment (10) from a source cell (40A) to a target cell (40B; 40C); means configured to transmit an acknowledgement of handover request to the source cell (40A); and means to receive forwarded data packets forming a series of data packets to be transmitted to user equipment (10), the forwarded data packets comprising an indication of a sequence identifier associated with each forwarded data packet and an indication of a most recent successfully received data packet sequence identifier. Arrangements recognise that one way to mitigate some of the negative effects associated with early data forwarding, for example, the increased use of network memory and the risk of duplicate transmissions, is by providing a mechanism supported by a source (20A) and target node (20B) to allow a target access node (20B) to perform efficient data discarding.

11 Claims, 3 Drawing Sheets

(56) References Cited

U.S. PATENT DOCUMENTS

| | | | | |
|---|---|---|---|---|
| 2012/0236821 | A1* | 9/2012 | Yamada | H04W 88/08 370/331 |
| 2015/0189555 | A1* | 7/2015 | Ahluwalia | H04L 47/34 370/331 |
| 2017/0230104 | A1* | 8/2017 | Purkayastha | H04W 48/20 |
| 2017/0237837 | A1 | 8/2017 | Sammour et al. | |
| 2018/0084464 | A1 | 3/2018 | Ozturk et al. | |
| 2018/0279193 | A1 | 9/2018 | Park et al. | |
| 2018/0317137 | A1* | 11/2018 | Loehr | H04W 36/0235 |
| 2019/0104452 | A1* | 4/2019 | Park | H04W 36/185 |
| 2019/0253942 | A1* | 8/2019 | Yoo | H04W 36/0038 |
| 2019/0363992 | A1 | 11/2019 | Basu Mallick et al. | |
| 2019/0387440 | A1 | 12/2019 | Yiu et al. | |
| 2020/0022055 | A1 | 1/2020 | Yan et al. | |
| 2020/0029251 | A1 | 1/2020 | Wu et al. | |
| 2020/0120554 | A1 | 4/2020 | Loehr et al. | |
| 2022/0159520 | A1* | 5/2022 | Zhou | H04W 36/0069 |

FOREIGN PATENT DOCUMENTS

| | | | | |
|---|---|---|---|---|
| EP | 2077688 A2 | * | 7/2009 | ............ H04W 36/02 |
| GB | 2572631 A | | 10/2019 | |
| JP | 2005073248 A | * | 3/2005 | ......... H04L 41/0869 |
| WO | 2020/058744 A1 | | 3/2020 | |
| WO | 2020/132427 A1 | | 6/2020 | |
| WO | 2020/172762 A1 | | 9/2020 | |

OTHER PUBLICATIONS

"Way forward on the selective DL PDCP duplication for URLLC", 3GPP TSG-RAN WG3 Meeting #103-bis, R3-192104, Agenda: 17.2.3, Nokia, Apr. 8-12, 2019, 2 pages.
"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.
"3rd Generation Partnership Project; Technical Specification Group Radio Access Network; NR; Multiplexing and channel coding (Release 16)", 3GPP TS 38.212, V16.1.0, Mar. 2020, pp. 1-146.
Amin et al., "Improved handover mechanisms to reduce packet forwarding in LTE-Advanced", 9th International Wireless Communications and Mobile Computing Conference (IWCMC), Jul. 1-5, 2013, pp. 831-836.
Toseef et al., "LTE system performance optimization by discard timer based PDCP buffer management", 8th International Conference on High-capacity Optical Networks and Emerging Technologies, Dec. 19-21, 2011, pp. 116-121.
"New Radio (NR) Access Technology", 3GPP TSG RAN meeting #76, RP-1711505, Agenda: 9.2.1, NTT Docomo Inc, Jun. 5-8, 2017, pp. 1-218.
"3rd Generation Partnership Project; Technical Specification Group Radio Access Network; NG-RAN; PDU Session User Plane Protocol (Release 16)", 3GPP TS 38.415, V16.1.0, Jul. 2020, pp. 1-15.
"3rd Generation Partnership Project; Technical Specification Group Radio Access Network; NR; Packet Data Convergence Protocol (PDCP) specification (Release 16)", 3GPP TS 38.323, V16.1.0, Jul. 2020, pp. 1-40.
"3rd Generation Partnership Project; Technical Specification Group Radio Access Network; NG-RAN; NR user plane protocol (Release 16)", 3GPP TS 38.425, V16.1.0, Jul. 2020, pp. 1-25.
Office action received for corresponding Finnish Patent Application No. 20206322, dated Apr. 15, 2021, 8 pages.
"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.3.0, Sep. 2020, pp. 1-390.
Office action received for corresponding Finnish Patent Application No. 20206322, dated Sep. 8, 2021, 6 pages.
International Search Report and Written Opinion received for corresponding Patent Cooperation Treaty Application No. PCT/EP2021/079356, dated Feb. 7, 2022, 16 pages.
International Preliminary Report on Patentability Chapter II received for corresponding Patent Coorporation Application No. PCT/EP2021/079356, dated Feb. 15, 2023, 12 pages.

* cited by examiner

HANDOVER WITH SEQUENTIALLY IDENTIFIED PACKETS

RELATED APPLICATION

This application claims priority to PCT Application No. PCT/EP2021/079356, filed on Oct. 22, 2021, which claims priority to FI Application No. 20206322 filed on Dec. 17, 2020, each of which is incorporated herein by reference in its entirety.

TECHNOLOGICAL FIELD

Various example embodiments relate to network nodes, methods and computer program products configured to hand over a communication link between a cell and user equipment in a wireless communication network from a source cell to a target cell.

BACKGROUND

Wireless communications systems are known. In those known systems, radio coverage is provided to network connectable devices, in the form of, for example, user equipment, by geographical area. A network access node, for example, a base station, is provided in a geographical area to support provision of the required radio coverage. Network access nodes and network connectable devices in an area served or supported by a network access node are configured to exchange information and data.

In known wireless telecommunications systems, network connectable devices are typically mobile and can move between areas of radio coverage provided by one or more network access nodes. When a network connectable device is in a connected state and moves between regions of radio coverage, there can be a need to adjust communication between the network and the network connectable device to maintain a continuity of service.

Although methods to maintain a continuity of service are known, it is desired to provide an alternative method which may mitigate issues with known techniques.

BRIEF SUMMARY

The scope of protection sought for various embodiments of the invention is set out by the independent claims. The arrangements, implementations, examples and features, if any, described in this specification that do not fall under the scope of the independent claims are to be interpreted as examples useful for understanding various embodiments of the invention.

According to various, but not necessarily all, embodiments of the invention there is provided a source node, comprising: means configured to establish a communication link between a source cell and user equipment; means configured to transmit a series of data packets to the user equipment, each data packet comprising an associated sequence identifier; means to receive an indication of successful receipt of a data packet of the series by user equipment, the acknowledgement comprising an indication of the successfully received data packet sequence identifier; means configured to receive an indication of an identified handover target cell; means configured to request handover of the user equipment to the identified handover target cell; means configured to receive an acknowledgement of handover request from the identified handover target cell; and means to forward data packets to be transmitted to user equipment to the identified target cell, the forwarded data packets comprising the indication of associated sequence identifier and the most recent successfully received data packet sequence identifier.

The handover may comprise: a conditional handover or dual active protocol stack handover.

The forwarded data packets may be directly forwarded from a source node to a node supporting a target cell using node to node signalling, or may be routed from a source node to a target node via a core network.

The node may be configured to operate such that the forwarded data packet including the most recent successfully received data packet sequence identifier is encoded within a packet substantially the same size as the data packet.

The node may be configured to operate such that the forwarded data packet including the most recent successfully transmitted data packet sequence identifier at the source node is encoded to reuse one or more available non-payload bits within a typical data packet forming the series of data packets.

The most recent successfully received data packet sequence identifier may be encoded in one or more of: a header or extended header of a packet being forwarded to the identified target cell; an optional information element included in a signalling message transmitted with a forwarded packet to the identified target cell.

The node may comprise means configured to select an interval between successive forwarding of data packets.

Selection of the interval may be based upon a rate of packet retransmission being experienced at the source node.

The node may comprise means configured to forward a second of two consecutive packets to the target cell only after the first of the consecutive packets has been successfully acknowledged by user equipment.

The node may be such that the means comprise: at least one processor; and at least one memory including computer program code, the at least one memory and computer program code being configured to, with the at least one processor, cause the performance of the node.

According to various, but not necessarily all, embodiments of the invention there is provided a method performed at a source node, the method comprising: establishing a communication link between a source cell and user equipment; transmitting a series of data packets to the user equipment, each data packet comprising an associated sequence identifier; receiving an indication of successful receipt of a data packet of the series by user equipment, the acknowledgement comprising an indication of the successfully received data packet sequence identifier; receiving an indication of an identified handover target cell; requesting handover of the user equipment to the identified handover target cell; receiving an acknowledgement of handover request from the identified handover target cell; and forwarding data packets to be transmitted to user equipment to the identified target cell, the forwarded data packets comprising the indication of associated sequence identifier and the most recently received successfully received data packet sequence identifier.

The handover may comprise: a conditional handover or dual active protocol stack handover.

The forwarded data packet including the most recent successfully received data packet sequence identifier may be encoded within a packet substantially the same size as the data packet.

The forwarded data packet including the most recent successfully received data packet sequence identifier may be encoded to reuse one or more available non-payload bits within a typical data packet forming the series of data packets.

The most recent successfully received data packet sequence identifier may be encoded in one or more of: a header or extended header of a packet being forwarded to the identified target cell; an optional information element included in a signalling message transmitted with a forwarded packet to the identified target cell.

The method may comprise selecting an interval between successive forwarding of ongoing data packets.

Selection of the interval may be based upon a rate of packet retransmission being experienced at the node.

The method may comprise forwarding a second of two consecutive packets to the target cell only after the first of the consecutive packets has been successfully acknowledged by user equipment.

According to various, but not necessarily all, embodiments of the invention there is provided a computer program product comprising computer readable instructions which, when executed by a computer on a node, are configured to cause the node to perform a method as described above.

According to various, but not necessarily all, embodiments of the invention there is provided a target node, comprising: means configured to receive a request for handover of user equipment from a source cell to a target cell; means configured to transmit an acknowledgement of handover request to the source cell; and means to receive forwarded data packets forming a series of data packets to be transmitted to user equipment, the forwarded data packets comprising an indication of a sequence identifier associated with each forwarded data packet and an indication of a most recent successfully received data packet sequence identifier.

The target node may comprise: means to store the received forwarded data packets forming the series of data packets to be transmitted to user equipment; and means to discard the data packets having a sequence identifier which precedes the most recent successfully received data packet sequence identifier.

The node may comprise: means to establish a communication link between the target cell and the user equipment; means to transmit a series of data packets having a sequence identifier which follows the most recent successfully received data packet sequence identifier to the user equipment.

The node may comprise at least one processor; and at least one memory including computer program code, the at least one memory and computer program code being configured to, with the at least one processor, cause the performance of the node.

According to various, but not necessarily all, embodiments of the invention there is provided a method performed by a node, the method comprising: receiving a request for handover of user equipment from a source cell to a target cell; transmitting an acknowledgement of handover request to the source cell; and receiving data packets forming a series of data packets to be transmitted to user equipment, the forwarded data packets comprising an indication of a sequence identifier associated with each forwarded data packet and an indication of a most recent successfully received data packet sequence identifier.

The method may comprise: storing the received data packets forming the series of data packets to be transmitted to user equipment; and discarding the data packets having a sequence identifier which precedes the most recent successfully received data packet sequence identifier.

The method may comprise: establishing a communication link between the target cell and the user equipment; and transmitting a series of data packets having a sequence identifier which follows the most recent successfully received data packet sequence identifier to the user equipment.

According to various, but not necessarily all, embodiments of the invention there is provided a computer program product comprising computer readable instructions which, when executed by a computer on a node, are configured to cause the node to perform a method as described above.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Before discussing the example embodiments in any more detail, first an overview will be provided.

By way of background, a typical wireless telecommunications system comprises network connectable devices, such as user equipment, which are free to roam through the wireless telecommunications system. Network access nodes are provided which support areas of radio coverage. A number of such access nodes are provided in a network and are distributed geographically in order to provide a wide area of coverage to network connectable nodes.

When a network connectable node or device is within an area of coverage supported by a network access node, communication links may be established between them.

As network connectable devices roam through the wireless telecommunications system they may move from an area of radio coverage supported by one access node to an area of radio coverage supported by another access node. In order to ensure continuity of service to a device when in active use, the wireless telecommunications system operates to "hand over" communication between a network access node and device between a source network access node towards a target access node.

Various transfer mechanisms, known as handover mechanisms can be implemented in a network. Hereinafter the term "legacy handover" is used to refer to handover as it has typically been implemented, and "CHO handover" to refer to "conditional" handover.

Figure 1:
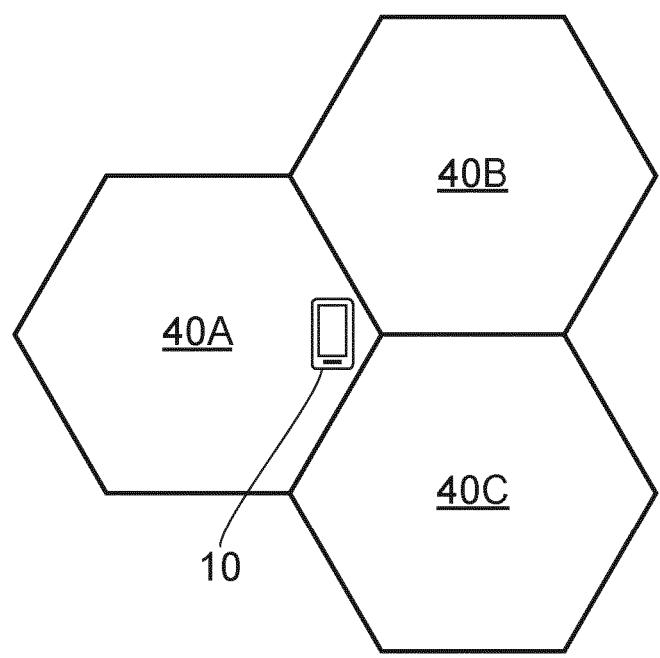
FIG. 1 illustrates schematically a scenario in which handover between cells in a wireless communication network may be required.

FIG. 1 illustrates schematically a scenario in which handover between cells in a wireless communication network may be required. As shown in FIG. 1, a wireless communication network may be formed as regions of radio coverage known as cells 40. Those cells are supported by one or more network access nodes. Network connectable devices, such as user equipment 10, are free to move within the regions of radio coverage 40. As shown in FIG. 1, user equipment 10 may be in a source cell 40A supported by a network access node (not shown). As the user equipment approaches the edge of cell 40A, it can begin to see the radio coverage of neighbouring cells 40B and/or 40C. If the user equipment continues to move towards those cells, it would be typical for cell 40A to no longer be a primary or "source" of radio coverage being offered to the user equipment 10 and instead responsibility of hosting the radio connection for that user equipment will be transferred or "handed over" to a network access node supporting cell 40B or cell 40C.

The model for legacy handover comprises the following steps:
1. A source radio access network (RAN) node (for example, an eNB or gNB) configures measurements to a network connectable device, for example, user equipment UE.
2. The UE performs radio measurements and, when reporting conditions are verified for a neighbour cell, sends a measurement report message to the source RAN node.
3. The source RAN node sends a handover request to a target RAN node managing the neighbour cell. The target RAN node prepares itself to receive the UE.
4. The target RAN node replies to the source RAN node, and provides a handover command for the source RAN node to send to the UE.
5. The source RAN node sends the handover command to the UE and starts forwarding downlink data to the target RAN node so that the target RAN node is able to send that downlink data to the UE once the handover from source RAN node to target RAN node has completed. That downlink data is provided to the target RAN node to try to ensure a lossless handover, i.e. a handover without any data loss.
6. The UE accesses the new (neighbour) cell via the target RAN node The legacy handover process is such that, under poor radio conditions as may be likely at the edge of a region of radio coverage, where handover may be expected, the measurement report at step 2 and/or the handover command in step 5 may be lost on the radio interface.

Conditional Handover (CHO) improves robustness of transfer of communication responsibilities between RAN access nodes by ensuring that the measurement report of step 2 above and the handover command message of step 5 are transferred earlier in the transfer process, when radio conditions are likely to be better.

The model for the Conditional Handover comprises the following steps:
1. A source RAN access node (for example, eNB or gNB) configures a first set of measurements to a network connectable device, for example, user equipment UE. The thresholds used for these measurements are typically lower than those used for legacy handover, since the intention is to identify neighbour cell candidates some time before handover is actually needed.
2. The UE performs radio measurements and sends a measurement report message to the source RAN node when reporting conditions are verified as met in relation to a neighbour cell. Most measurement report messages will contain a single neighbour cell that verifies the reporting conditions. However, in some situations, the UE may see more than one neighbour cell which verifies the reporting conditions.
3. The source RAN access node sends a conditional handover request to a target RAN access node managing the neighbour cell. The target RAN access node(s) prepares itself to receive the UE.
4. The target RAN access node replies to the source RAN access node and provides a handover command message in relation to the relevant cell.
5. The source RAN access node configures a second set of measurements to the UE, and links them with the handover command message in relation to the neighbour cell.
6. The UE performs radio measurements, and when reporting conditions are verified for the neighbour cell, the UE uses the handover command message received previously to access the new cell in the target RAN access node.

Accordingly, there is no sending of a measurement report or handover command when the radio conditions may be poor at the edge of a cell supported by the source RAN access node, and when a handover is most likely to be needed. In the case of a conditional handover process, data forwarding from a source RAN access node to one or more target RAN access node may start as soon as step 5 (referred to as "early data forwarding") or as late as step 6 is completed (referred to as "late data forwarding") for example occurring a few seconds after step 5. Data forwarding to the target node of data packets which are being transmitted to the UE by the source node may also start at any point in between. It will be appreciated that the number of cells that are prepared has an impact on data forwarding, particularly in cases where data forwarding starts before the handover has actually completed. The more target cells which are prepared, the more data needs to be forwarded since the same data must be forwarded to each target cell. Furthermore, that forwarded data needs to be stored by each target cell until the UE has accessed its cell and the network can send the forwarded data to the UE. The data will also be stored by a target cell until the network informs that cell that the handover is cancelled or until the data is discarded as a result of usual timeout settings.

It can be appreciated that a conditional handover has advantages. By offering a buffer of data and by implementing messaging in support of handover before a mobile UE is likely to suffer poor radio conditions at the edge of a cell, it is possible to offer a more robust handover procedure and a shorter data interruption time offered by early data forwarding. Nonetheless, it will also be appreciated that early data forwarding may be problematic. Early data forwarding increases network buffer usage, since more data gets forwarded especially where multiple cells may be prepared and need data to be forwarded. Such forwarding may occur over a longer time period compared to legacy handover arrangements, since data forwarding is triggered early and CHO completion may not occur immediately. Early data forwarding increases network memory consumption, since forwarded packets may be stored in one or more target cells until the CHO has completed. The data which needs to be stored may not be insignificant, since the time before CHO completion is unpredictable and may be over a second.

It has also been found that handover processes can lead to duplicate transmissions over the air to a UE. The target cell is configured to start sending the forwarded data to the UE immediately after CHO completion. That configuration minimises any data interruption time. However, some of the data sent by the target cell may have already been successfully sent by the source cell to the UE. Such duplicate transmissions delay the transmission of fresh data and therefore have an impact upon perceived data interruption time from the perspective of an end user.

Arrangements recognise that it is possible to implement mechanisms which can mitigate some of the negative effects associated with early data forwarding, whilst maintaining the benefits.

Figure 2:
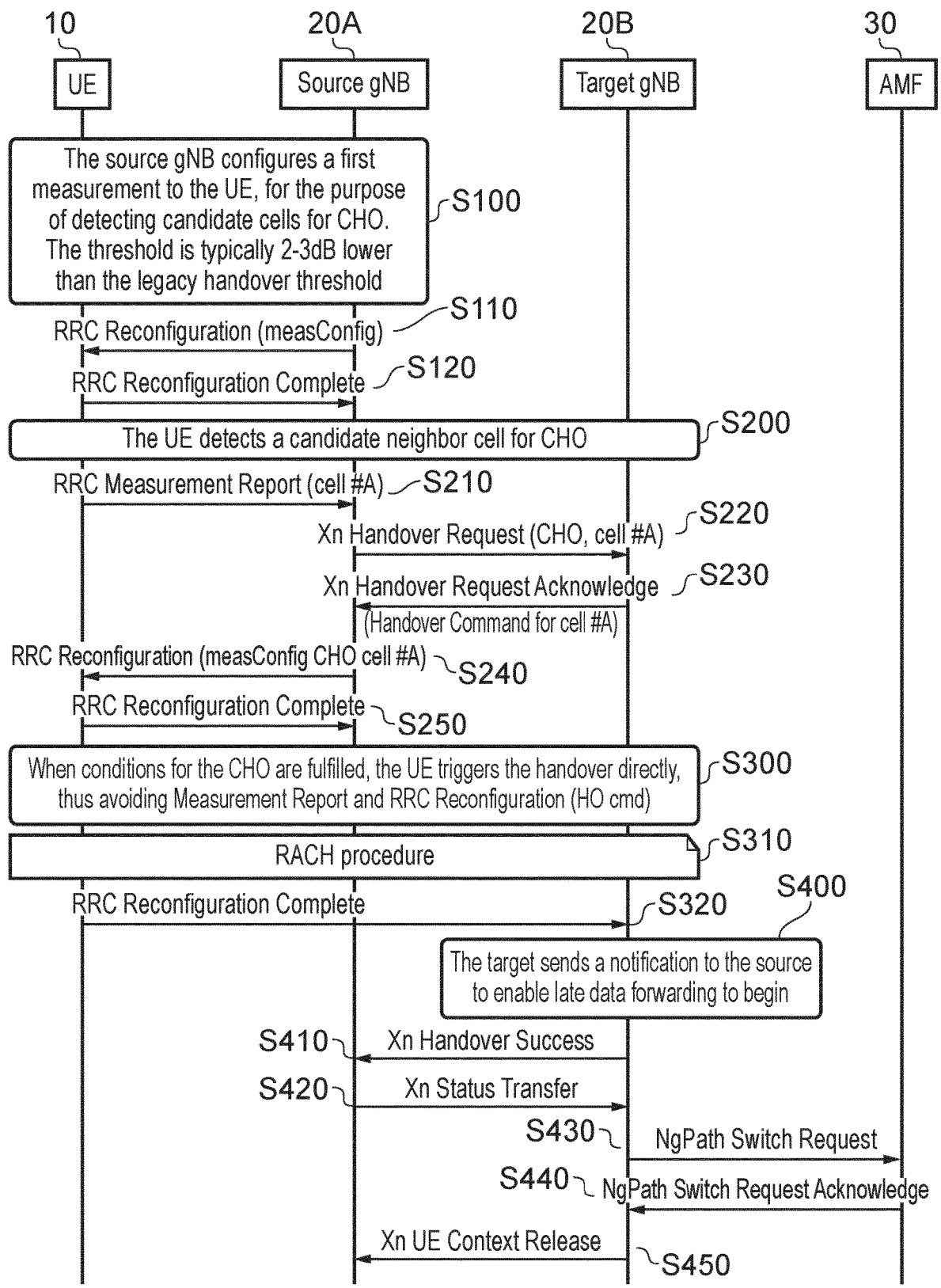
FIG. 2 is a signalling diagram relating to a typical conditional handover implementation.

FIG. 2 is a signalling diagram relating to a typical conditional handover implementation. FIG. 2 illustrates the signalling which occurs between user equipment 10, a source network access node 20A, a target network access node 20B and a mobility management entity (MME) or mobility and access management entity (AMF) 30 forming part of a core network.

As described above, in support of a conditional handover, main signalling steps implemented are as follows:

S100: The source network access node 20A, in this instance, a source gNB, operates to configure a first measurement to the UE 10, that measurement being related to a threshold for detection of candidate cells for CHO. The measurement threshold selected for candidate CHO cells is typically a few decibels lower than a threshold associated with legacy handover. The messaging comprises:

S110: RRC Reconfiguration (measConfig) sent from Source gNB 20A to UE 10.

S110: RRC Reconfiguration complete sent from UE 10 to Source gNB 20A.

S200: UE 10 detects a candidate neighbour cell (cell A) for conditional handover. That target cell is supported by Target gNB 20B.

S210: The UE 10 sends and RRC Measurement report identifying cell A as a candidate neighbour cell to Source gNB 20A.

S220: The source gNB 20A uses Xn signalling to send an Xn Handover request in relation to UE 10 for CHO to Cell A. That request is sent to the network access node 20B which supports target cell A.

S230: Target gNB 20B sends an Xn Handover request acknowledgement back to source gNB 20A. The acknowledgement includes a handover command relating to cell A.

S240: Source gNB 20A sens UE 10 an RRC Reconfiguration including a measConfig CHO to cell A value and the handover command relating to cell A received from Target gNB 20B.

S240: UE 10 sends an RRC Reconfiguration Complete message to Source gNB 20A.

S300: When conditions for CHO to cell A are determined to be met by UE 10, the UE triggers the handover directly.

S310: The UE 10 and Target gNB 20B engage in a typical RACH procedure to set up a communication channel between the UE and target gNB.

S320: The UE sends an RRC Reconfiguration Complete message to Target gNB 20B.

S400: The target gNB 20B sends a notification to the source gNB 20A to enable late data forwarding to commence.

S410: The target gNB 20B sends an Xn Handover Success message to source gNB 20A.

S420: The source gNB 20A acknowledges Xn Status transfer to the target gNB 20B.

S430: The target gNB 20B sends an Ng Path Switch Request to AMF 30.

S440: The AMF 30 acknowledges the Ng Path Switch Request to Target gNB 20B; and

S450: The target gNB 20B informs the source gNB 20A via Xn of UE 10 context release.

According to various, but not necessarily all, arrangements there is provided a source network access node configured to provide user equipment with a region of radio coverage. That region of radio coverage may comprise a source cell, which the user equipment is performing active communication with. The source network access node may comprise communication link circuitry configured to establish a communication link between a source cell and user equipment and transmission circuitry configured to transmit a series of data packets to the user equipment, each data packet comprising an associated sequence identifier. The network access node supporting a source cell may include reception circuitry configured to receive an indication of successful receipt of a data packet of the series by user equipment. The received acknowledgement may comprise an indication of the most recent successfully received data packet sequence identifier. The source cell can include handover circuitry configured to receive an indication of an identified handover target cell from user equipment and configured to request handover of the user equipment to the identified handover target cell. The handover target cell may be supported by a target network access node. The handover circuitry may also be configured to receive an acknowledgement of handover request from the identified handover target cell, so that the source cell can be aware that the target cell is aware of the potential handover of the user equipment, and the acknowledgement may include a handover command, which the source cell may be configured to transmit to the user equipment. The source network access node may include means to forward subsequent data packets to be transmitted to user equipment to the identified target cell. The forwarded data packets may include the indication of associated sequence identifier in relation to each data packet and the most recent, and/or highest numbered successfully received data packet sequence identifier.

According to various, but not necessarily all, embodiments of the invention there is provided a target network access node, comprising: handover circuitry configured to receive a request for handover of user equipment from a source cell to a target cell supported by the target network access node and to transmit an acknowledgement of handover request to the source cell, indicating that transfer of the user equipment to the target cell is supportable. The acknowledgement may include a handover command for forwarding to the user equipment by the source network access node supporting the source cell. The target network access node may include reception circuitry configured to receive data packets forming a series of data packets to be transmitted to user equipment, the forwarded data packets comprising an indication of a sequence identifier associated with each forwarded data packet and an indication of a most recent successfully received data packet sequence identifier.

Arrangements recognise that one way to mitigate some of the negative effects associated with early data forwarding, for example, the increased use of network memory and the risk of duplicate transmissions, is by providing a mechanism to allow a target access node to perform efficient data discarding. One route which may support efficient data discard at a target network access node is provided when a source network access node provides information about those data packets, for example, Packet Data Convergence Protocol (PDCP) packets, which have been successfully delivered to user equipment to a target network access node.

Arrangements provide ways in which that information can be provided to a target network access node without adding to the size of messages already being transmitted to that target node. In one arrangement, for example, a source network access node may be configured to include a sequence number of the last successfully acknowledged PDCP packet to the target network access node. That sequence number may be included, for example in a pre-existing GPRS Tunnelling Protocol (GTP) extension header, in each forwarded packet Arrangements provide an indication of the last data packet successfully received by user equipment to a target network access node. It will be appreciated that the indication of acknowledged packet serial number at a source network access node will differ from the downlink packet number itself. A serial number of a data packet is already included in forwarded data packets, to allow reassembly of a series of data packets at a target network access node and at user equipment, as applicable. By way of example: A downlink packet serial number, for example, PDCP SN, associated with a forwarded downlink packet (PDU) could be 100. The last successfully acknowledged downlink data packet (ACKED PDCP SN) known to the source network access node (source gNB) could be 90. In a subsequent forwarding, the PDCP SN of a forwarded PDU could be 101 and yet the last successfully ACKED PDCP SN at the source gNB could remain 90.

Described arrangements can allow a target RAN network access node to receive an indication, for example, Sequence Number, of the last acknowledged PDCP packet received by user equipment. The target network access node can therefore discard the identified "received" packet and previous packets in full knowledge that these have been received by the UE. Such a discard frees up storage space across target network access nodes and minimize memory needed in the target RAN node(s) to store forwarded packets Described arrangements may mitigate the risk of sending duplicate packets to user equipment over the air interface, which means that fresher packets will not be delayed by the re-sending of duplicate packets. Furthermore, there may be less radio interface consumed in relation to sending packets which the UE has already received FIG. 3 is a partial signalling diagram illustrating schematically one arrangement in which data packet forwarding between a source and target network access node may be implemented.

Figure 3:
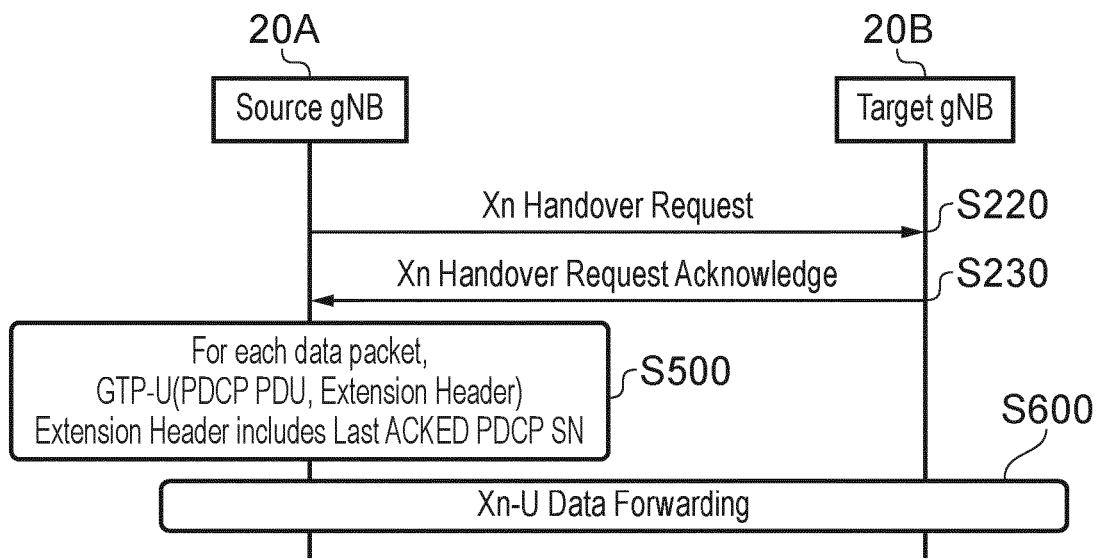
FIG. 3 is a partial signalling diagram illustrating schematically one arrangement in which data packet forwarding between a source and target network access node may be implemented.

In the arrangement shown schematically in FIG. 3, as described in relation to FIG. 2, the following steps occur:

S220: The source gNB 20A uses Xn signalling to send an Xn Handover request in relation to UE 10 for CHO to Cell A. That request is sent to the network access node 20B which supports target cell A.

S230: Target gNB 20B sends an Xn Handover request acknowledgement back to source gNB 20A. The acknowledgement includes a handover command relating to cell A.

S500: The source network access node 20A is configured, for each data packet intended to be sent to user equipment, to prepare an appropriate data packet to be forwarded to the target network access node 20B. According to arrangements, the forwarded data packet will include an indication of the last successfully received downlink packet at the user equipment 10.

S600: The source network access node 20A forwards appropriately prepared data packets, for example using Xn-U data forwarding, to the target network access node 20B.

Several possible implementations to inform a target RAN network access node of which UE downlink data packets, for example, PDCP packets, have successfully been delivered to the UE are described in detail below. Alternative implementations achieving the same functionality are possible.

Furthermore, although described in relation to Conditional Handover Implementations, it will be appreciated that analogous techniques may be used to improve efficiency in signalling and storage associated with Dual Active Protocol Stack (DAPS) handover arrangements implemented in 5G networks. DAPS Handover is such that a UE continues communication within a source cell after receiving a specific handover request. The UE is configured to perform simultaneous reception of user data from both a source and a target cell, and switches uplink transmission of user data to the target cell after completion of the RACH procedure. Use of DAPS reduces interruption during handover close to oms, by maintaining the source cell radio link (including data flow) whilst fully establishing a target cell radio link. Use of DAPS required both source and target network access nodes to transmit the "same" data packets to user equipment. Use of arrangements described can help to mitigate repetition and storage of unnecessary downlink packets at a source and target cell, since knowing which packets have been received successfully by user equipment allows for discard of those unnecessary packets in a stack to be transmitted to user equipment.

How to Provide the Relevant Information to a Target Network Access Node

Location of Information

Implementations seek to piggyback an indication of last successfully received downlink packet into existing packets being transferred between a source network access node and one or more target network access nodes.

One such implementation is to piggyback an indication of the last UE acknowledged PDCP sequence number into each forwarded PDCP packet. This can be achieved, for example, by making use of a new standardized GTP Extension Header, by making use of extensions of the GTP-U PDU Session Container header, or by using a GTP Private Extension. In each case, the signalling overhead associated with a small adaptation of packets already being sent is lower than might be associated with a new dedicated message. That is to say, the forwarded message including additional information may be substantially the same size as one in which no additional information is included. By including information, which may be encoded in an additional byte or two of an existing message, efficient use of packets already being transferred between a source and target network access node may be made.

Whichever location for the information is chosen, implementations are such that they can include an indication of which downlink packets have been successfully received by user equipment seeking to handover from a source cell to a target cell. Some implementations are such that the source network access node is configured to provide a packet Sequence Number indicative of the last PDCP packet acknowledged by a UE when forwarding packets to the target RAN network access node.

Extended Header

One possible mechanism which could be utilised in support of implementations is that of allocating a portion of a header or extended header of a packet being forwarded from source node to target node. For example, a new value could be added to an extension to a GTP-U PDU Session Container header as shown in underline:

| Next Extension Header Field Value | Type of Extension Header |
|---|---|
| 0000 0000 | No more extension headers |
| 0000 0001 | Reserved-Control Plane only. |
| 0000 0010 | Reserved-Control Plane only. |
| 0000 0011 | Long PDCP PDU Number. See NOTE 2. |
| 0000 0100 | Last acknowledged PDCP SN |
| 0010 0000 | Service Class Indicator |
| 0100 0000 | UDP Port. Provides the UDP Source Port of the triggering message. |
| 1000 0001 | RAN Container |
| 1000 0010 | Long PDCP PDU Number. See NOTE 3. |
| 1000 0011 | Xw RAN Container |
| 1000 0100 | NR RAN Container |
| 1000 0101 | PDU Session Container. See NOTE 4. |
| 1100 0000 | PDCP PDU Number [4]-[5]. See NOTE 1. |
| 1100 0001 | Reserved-Control Plane only. |
| 1100 0010 | Reserved-Control Plane only. |

NOTE 1:
As an exception to the comprehension rule specified above, for a G-PDU with a Next Extension Header Field set to the value "1100 0000", the SGW shall consider this corresponding extension header as 'comprehension not required'.
NOTE 2:
This value shall be used by a source eNB or gNB complying with this release of the specification.
NOTE 3:
This value shall not be used by a source eNB or gNB complying with this release of the specification. It may be received from a source eNB complying with an earlier release of the specification, i.e. not supporting the extension header value "0000 0011".
NOTE 4:
For a GTP-PDU with several Extension Headers, the PDU Session Container should be the first Extension Header.

In relation to a GTP Extension Header implementation, it will be appreciated that during the CHO and early data forwarding (similar to lossless HO), tunnels on the Xn are established per Dedicated Radio Bearer (DRB). On a DRB specific tunnel, only PDCP Service data Units (SDUs) (and Service Data Adaptation (SDAP) protocol data units (PDUs)) could be forwarded along with an associated PDCP serial or sequence number. Plain PDCP SDUs (having no serial number assigned) cannot be forwarded until handover success is indicated to a source network access node, since downlink data transmission from the source node will be ON until the HO execution. This is true irrespective of one or multiple Quality of Service Flows (QFIs) being mapped to the same DRB.

The PDCP serial or sequence number associated with the PDCP SDUs are carried via the "PDCP PDU number" field of the proposed GTP-U extension header.

For information, a PDU session container is not used when forwarding data on DRB specific tunnels over Xn i.e in a Xn based handover. This is used in case of a NG based handover. This applies to both cases where Source QoS flow to DRB mapping is accepted by a target, and where it is differently mapped by a target gNB. Despite this, alternative implementations may effectively utilise a PDU Session Container Extension.

PDU Session Container Extension

Alternative implementations are such that the PDU Session Container GTP-U Extension header defined generally above is utilised, but with an extension defined in the PDU Session Container to provide an indication of the Sequence Number of the last acknowledged PDCP packet when forwarding a packet from the source RAN node to the target RAN node, via the core network. Such an extension to the PDU Session Container may, for example, be implemented as indicated below:

Excerpt from TS 29.281
5.2.2.7 PDU Session Container

This extension header shall be transmitted in a user data message (G-PDU) over the Interface between a RAN network access node (gNB) and an initial user plane function UPF (ie N3 user plane) and the interface between two user plane functions (ie N9 user plane interfaces), between NG-RAN and UPF, or between two UPFs. It shall also be transmitted in End Marker packets over data forwarding tunnels in 5GS, for data forwarding between 5GS and EPS. The PDU Session Container has a variable length and its content is specified in 3GPP TS 38.415 [31].

| | Bits | | | | | | | |
|---|---|---|---|---|---|---|---|---|
| Octets | 8 | 7 | 6 | 5 | 4 | 3 | 2 | 1 |
| 1 | oxn | | | | | | | |
| 2-(4n −1) | PDU Session Container | | | | | | | |
| 4n | Next Extension Header Type (NOTE) | | | | | | | |

NOTE: The value of this field is 'o' if no other Extension header follows.

Two possible PDU Session Container Extensions are given in TS 38.415, and the inclusions required to support implementations of the present innovation are underlined:
1. DL PDU Session Information (PDU Type o)

This frame format is defined to allow an NG-RAN (network access node) to receive some control information elements which are associated with the transfer of a packet over the interface. The following table comprises a representation of a DL PDU SESSION INFORMATION frame.

| Bits | | | | | | | | Number |
|---|---|---|---|---|---|---|---|---|
| 7 | 6 | 5 | 4 | 3 | 2 | 1 | 0 | of Octets |
| PDU Type (= 0) | | | | QMP | SNP | Spare | | 1 |
| PPP | RQI | QoS Flow Identifier | | | | | | 1 |
| PPI | | | Spare | | | | | 0 or 1 |
| DL Sending Time Stamp | | | | | | | | 0 or 8 |
| DL QFI Sequence Number | | | | | | | | 0 or 3 |
| Last acknowledged PDCP SN | | | | | | | | 0 or 3 |
| Padding | | | | | | | | 0-3 |

Inclusion of a last acknowledged PDCP SN supports a method for discarding unnecessary forwarded packets at a target network access node.
2. DL PDU Session Information (PDU Type o) Format The following table comprises a representation of a DL PDU SESSION INFORMATION frame which could be utilised in support of implementations of the present innovation. The inclusions required to support implementations of the present innovation are underlined:

| Bits | | | | | | | | Number |
|---|---|---|---|---|---|---|---|---|
| 7 | 6 | 5 | 4 | 3 | 2 | 1 | 0 | of Octets |
| PDU Type (= x) | | | | Spare | | | | 1 |
| Last acknowledged PDCP SN | | | | | | | | 0 or 3 |
| Padding | | | | | | | | 0-3 |

Whilst it will be appreciated that the PDU Session Container would normally not be included in packets forwarded over Xn in the case of conditional handover (CHO) or Dual Active Protocol Stack (DAPS) handovers, in support of described implementations it could still be, by convention, used in these scenarios.

It will be appreciated that implementations using the GTP-U PDU Session Container extension are such that the PDU session container is only used for PDU session level data forwarding tunnel(s). On such tunnels, SDAP SDUs are forwarded over Xn-U or NG-U. If CHO is supported for NG-based handover, then the PDU session container needs to be extended with the "last acknowledged PDCP SN" indication on a per-dedicated radio bearer (DRB) basis. All of the Quality of Service Flows (QFI(s)) mapped to a given DRB would carry the same "last acknowledged PDCP SN".

GTP Private Extension

An alternative location for the relevant information is to use a proprietary implementation and make use of a GTP Private Extension. Typically a GTP private extension allows for vendor specific information to be transferred between elements forming a network. It takes the form generally of an optional information element which can be included in any GTP signalling message. A signalling message may include more than one information element of the private extension type.

The following table comprises a representation of a private extension information element which could be utilised in support of implementations of the present innovation.

|        | Bits |   |   |   |   |   |   |
|--------|------|---|---|---|---|---|---|
| Octets | 7    | 8 | 5 | 4 | 3 | 2 | 1 |
| 1      | Type = 255 (Decimal) |||||||
| 2-3    | Length |||||||
| 4-6    | Extension Identifier |||||||
| 6-m    | Extension Value |||||||

The private extension information element could include an indication of the information being provided (Last acknowledged PDCP SN) in octets 4-5 and the value in octets 6-m.

Timing of Information

It will be appreciated that it may be possible to mitigate unnecessary data forwarding within a network in support of handover by implementing intelligent forwarding methods. Forwarding approaches implemented by a source network access node may take account of when to forward data packets and, in particular, the timing of transmission between forwarded data packets.

By way of example, a source RAN network access node may be configured to elect to pace the forwarding of packets to a target RAN network access node (in other words send one packet every interval of x milliseconds). The inter-packet forwarding timing may be selected such that a source network access node has more opportunities to signal a recently acknowledged PDCP packet to a target network access node. The duration between two forwarded data packets may be configurable, based on, for example, transmissions/re-transmissions being experienced at the source gNB.

Alternatively, after forwarding a first packet to a target RAN node, a source RAN node may be configured to forward the next packet only after the first packet has successfully been acknowledged by user equipment.

Furthermore, if source radio conditions are determined to be good, for example, based on transmissions/re-transmissions being experienced at the source gNB, the source node could be configured to bundle two or more "to be forwarded" PDUs together.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method performed at a node, the method comprising:
    establishing a communication link between a source cell and a user equipment;
    transmitting a series of data packets to the user equipment, each data packet comprising an associated sequence identifier;
    receiving an acknowledgement of successful receipt of a data packet of the series of data packets by the user equipment, the acknowledgement comprising a sequence identifier of the successfully received data packet;
    receiving an indication of an identified handover target cell;
    requesting handover of the user equipment to the identified handover target cell;
    receiving an acknowledgement of handover request from the identified handover target cell; and
    forwarding, to the identified handover target cell, data packets to be transmitted to the user equipment, each of the forwarded data packets comprising an associated sequence identifier and a sequence identifier of a respective most recent successfully received data packet.

2. A method performed by a node, the method comprising:
    receiving a request for handover of a user equipment from a source cell to a target cell;
    transmitting an acknowledgement of the handover request to the source cell; and
    receiving forwarded data packets forming a series of data packets to be transmitted to the user equipment, each of the forwarded data packets comprising an associated sequence identifier and a sequence identifier of a respective most recent successfully received data packet.

3. The method according to claim 2, further comprising:
storing the received forwarded data packets forming the series of data packets to be transmitted to the user equipment; and
discarding data packets of the received forwarded data packets having an associated sequence identifier that precedes one or more of the sequence identifiers of the respective most recent successfully received data packets.

4. The method according to claim 2, further comprising:
establishing a communication link between the target cell and the user equipment; and
transmitting the series of data packets, each having an associated sequence identifier that follows the sequence identifiers of the respective most recent successfully received data packets.

5. An apparatus, comprising:
at least one processor; and
at least one memory comprising computer program code,
the at least one memory and the computer program code configured to, with the at least one processor, cause the apparatus at least to
establish a communication link between a source cell and a user equipment;
transmitting a series of data packets to the user equipment, each data packet comprising an associated sequence identifier;
receive an acknowledgement of successful receipt of a data packet of the series of data packets by user equipment, the acknowledgement comprising a sequence identifier of the successfully received data packet;
receive an indication of an identified handover target cell;
request handover of the user equipment to the identified handover target cell;
receiving an acknowledgement of handover request from the identified handover target cell; and
forward, to the identified handover target cell, data packets to be transmitted to the user equipment, each of the forwarded data packets comprising an associated sequence identifier and a sequence identifier of a respective most recent successfully received data packet.

6. The apparatus according to claim 5, wherein the handover comprises a conditional handover or a dual active protocol stack handover.

7. The apparatus according to claim 5,
wherein comprising a sequence identifier of a respective most recent successfully received data packet in each of the forwarded data packets comprises encoding a sequence identifier of a respective most recent successfully received data packet within each of the forwarded data packets, and
wherein the forwarded data packets are substantially the same size as a data packet of the series of data packets.

8. The apparatus according to claim 5, wherein the sequence identifier of a respective most recent successfully received data packet in each of the forwarded data packets is encoded using one or more available non-payload bits within a typical data packet forming the series of data packets.

9. The apparatus according to claim 5, wherein the at least one memory and the computer program code are further configured to, with the at least one processor to cause the apparatus at least to:
select an interval between successive forwarding of data packets of the series of data packets.

10. The apparatus according to claim 9, wherein selection of the interval is based upon a rate of packet retransmission being experienced at the apparatus.

11. The apparatus according to claim 9, wherein the at least one memory and the computer program code are further configured to, with the at least one processor to cause the apparatus at least to:
forward a second of two consecutive packets to the identified handover target cell only after a first of the consecutive packets has been successfully acknowledged by the user equipment.

* * * * *